United States Patent Office 2,988,379
Patented June 13, 1961

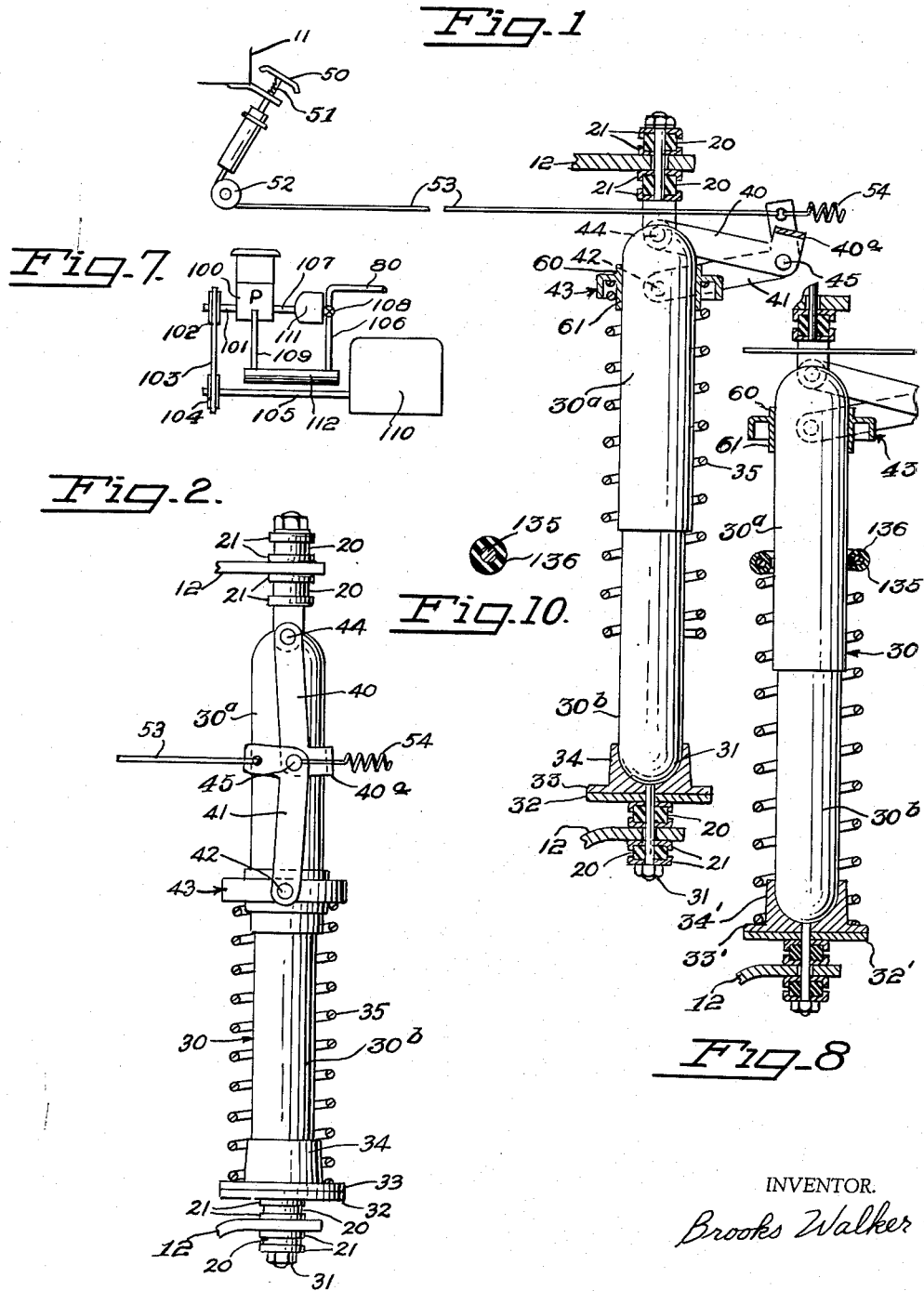

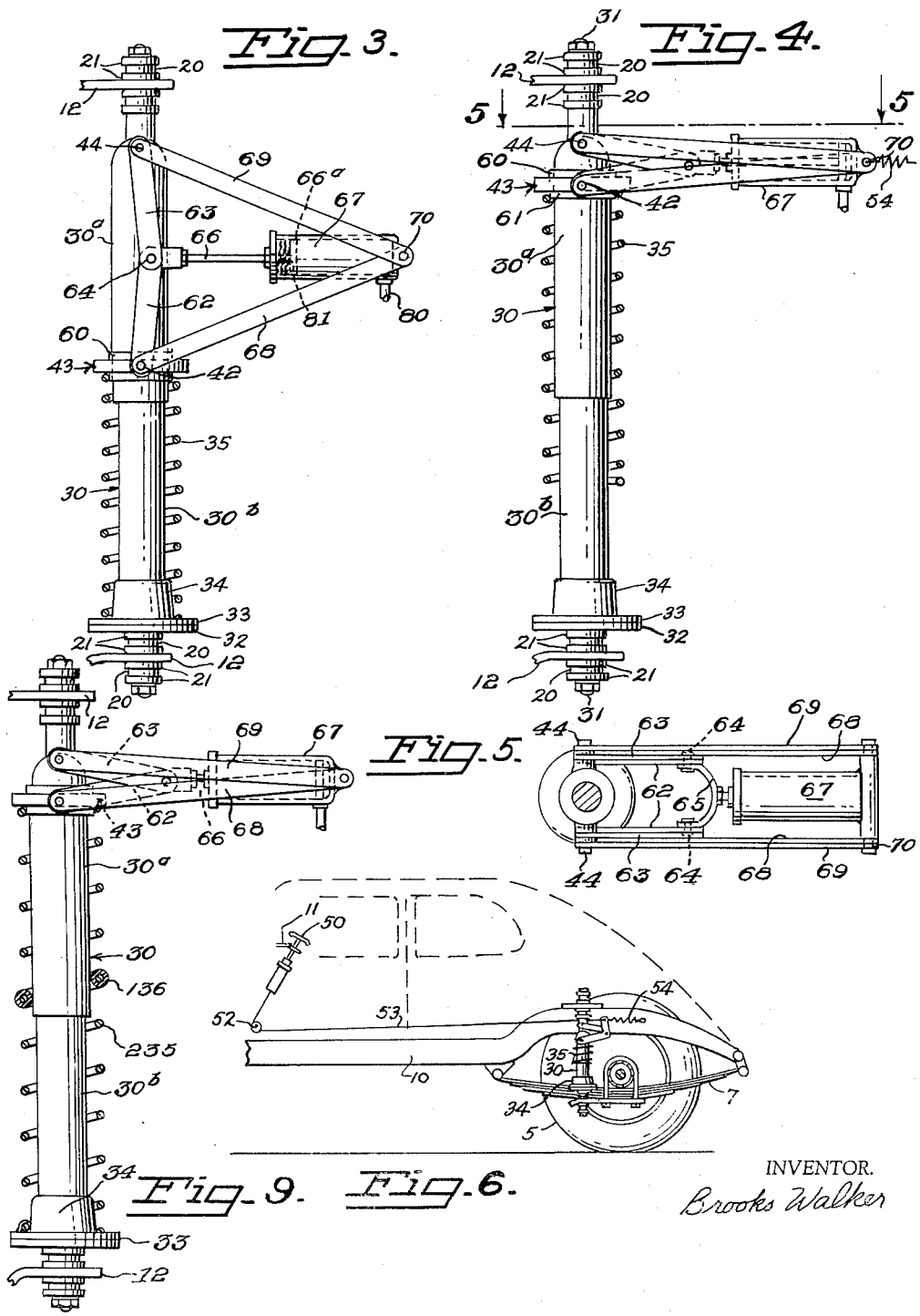

2,988,379
OVERLOAD SPRING FOR SHOCK ABSORBER
Brooks Walker, 155 Montgomery St.,
San Francisco, Calif.
Filed June 26, 1959, Ser. No. 823,077
2 Claims. (Cl. 280—124)

This invention pertains to the type of overload spring and associated means generally covered in my issued U.S. Patent No. 2,518,733, in which the overload spring is operable from the driver's compartment.

This particular invention involves improvements in the construction of an overload spring which may be readily applied to a telescoping type of shock absorber on road vehicles the upper end of which is mounted on the vehicle frame or vehicle body and the lower end of which is supported on the vehicle axle or wheel-supporting structure. These points of support for the shock absorber are already provided in modern road vehicle construction and are of sufficient strength to also support my overload springs etc. The telescoping type of shock absorber just referred to is suitable for guiding and carrying my overload coil type of spring. Hence, this invention involves a construction in which my overload auxiliary spring is made operative from a normally retracted and/or other inactive position, wherein the major portion of the vehicle spring action of the rear wheels relative to the frame and body may take place without affecting the operation of my auxiliary spring. My auxiliary spring is, therefore, made operative only for excessive deflection of the vehicle springs by the wheel supporting structure relative to the frame in traversing rough roads. The invention also includes means for an initial loading of my auxiliary spring by manual or power operated controls.

This application is a continuation-in-part of my co-pending application Serial No. 394,244, filed November 25, 1953, now Patent No. 2,892,636, dated June 30, 1959.

Another feature of the invention is the means by which added leverage is given to the mechanism for engaging the overload spring at the time when the load supporting position is being reached as compared with the leverage that is in effect between the control and the auxiliary spring loading mechanism at the start of operation or when the auxiliary spring is in load carrying position.

Another feature of the invention is to provide means whereby the overload spring may be normally in its inactive position and/or so held by a friction means or spring retraction and rendered active by hydraulic means against such friction or spring retraction.

Another feature of the invention is to provide means whereby this overload spring for the exterior of the shock absorber may be applied to existing shock absorbers with minimum or no changes so that it may readily be applied to cars that are already manufactured, or as easily to cars as they are being manufactured, as standard or auxiliary equipment.

Other features of the invention will be more particularly pointed out in the accompanying specification and claims.

I have illustrated my invention in the accompanying drawings as follows:

FIG. 1 is a side elevation partly cut away of one form of the invention;

FIG. 2 is a side elevation of the same invention shown in FIG. 1 but with the actuating mechanism in the load-carrying position;

FIG. 3 is a side elevation partly cut away of another form of the invention with the overload spring in preloaded position;

FIG. 4 is a side elevation of the device in FIG. 3, in relaxed position;

FIG. 5 is a top plan view of the form shown in FIGS. 3 and 4, taken on the line 5—5 of FIG. 4;

FIG. 6 is a reduced scale side elevation of a portion of a vehicle incorporating the invention shown in FIGS. 1 and 2;

FIG. 7 is a schematic view of a portion of a hydraulic system that could be used with this invention;

FIG. 8 is a slightly modified form of the invention shown in FIG. 1;

FIG. 9 is a side view similar to FIG. 4, showing a slight modification; and

FIG. 10 is a cross-section of a spring showing a means for reducing noise.

In all figures like numerals of reference refer to the corresponding parts.

In FIGS. 1, 2, and 6 I have shown a vehicle with a frame 10, a body 11, supporting wheels 5, and springs 7 between the wheels and the frame 10 and body 11. A shock absorber 30 of the telescoping type, such as is generally used on many American automobiles today, has added to it an auxiliary spring 35 carried by an annular upper retainer or bearing collar 43 and closely surrounding the upper portion 30a of the shock absorber 30. Pivots 42 on both sides of bearing 43 carry toggle arms 41 in front and in back of the shock absorber, as viewed in FIG. 2 and FIG. 6. Pivots 44 mounted on the upper end of the portion 30a carry links 40. The links 40, 41 are pivoted together at 45. Upper links 40 of the shock absorber have a curved connecting bar 40a which engages the upper portion of the shock absorber to prevent the toggle arms from passing the on-center position when pulled into the position shown in FIG. 2 by cable 53 passing around pulley 52 to engagement with operating handle 50 which is held in engaged position by ratchet 51 of the conventional hand-brake type. Spring 54 retracts the toggle composed of links 40 and 41 to the inactive position wherein spring 35 is raised out of contact with stops in the form of washers 32 and 33 and hub 34. The washer 33 and hub 34 are preferably of a non-metallic type so that when the lower end of spring 35 contacts them, a minimum of noise will result. These washers 32, 33 and hub 34 are preferably mounted on bolt 31 carried at the lower end of the shock absorber.

The shock absorber 30 comprises upper and lower telescoping tubular members 30a and 30b respectively. These members are closed at one end and the closed end is attached to the brackets 12, mounted on the chassis 10, by means of bolts 31. Resilient washers 20 held in cups 21 at each end thereof surround the bolts 31 and are placed on either side of the brackets 12.

In FIGS. 3, 4 and 5 a modified form of toggle is shown. The retainer or bearing 43 has upper and lower extensions 60, 61 respectively of sufficient length for it to slide smoothly on the upper movable portion 30a of the shock absorber 30. Two pairs of toggle links 62, 63 are pivoted respectively on the pivots 42, 44 and are connected by means of pivots 64 to a curved arm 65. The arm 65 engages the portion 30a in operative position. The arm 65 is connected to a piston rod 66 having a head 66a operating in a cylinder 67. Two pairs of arms 68, 69 are connected at one end respectively to the pivots 42 and 44 and are pivoted at 70 on the cylinder 67. Fluid under pressure is introduced into the cylinder 67 by means of the pipe 80 later to be described.

In FIG. 7, I show a means which may be used to supply fluid pressure for the piston 66a. A power steering pump 100 is mounted in a suitable location on the vehicle frame and has a shaft 101 driven by a pulley 102 and belt 103 connected to a pulley 104 and shaft 105 driven by the engine 110 of the vehicle. Fluid under pressure passes by way of the pipe 107 to the valve body 111, and is controlled by the valve 108 to admit fluid into the pipe 80 and to the cylinder 67. A bypass arrangement includes the pipes 106 and 109, and the power steering system 112.

To preload the spring 35 in this form of the invention, the valve 108 in the driver's compartment is operated to admit fluid to the cylinder 67 through the pipe 80. To retract the toggle a spring 54 may be connected to the pivot 70, or a spring 81 may be mounted inside the cylinder to force the piston back.

It is to be noted that the cylinder and piston rod are connected to opposite sides of a quadrilateral linkage or toggle arrangement and the linkage is spread as shown in FIG. 3 to force the spring 35 down onto the hub 34. This connection causes a minimum of side thrust on the bearing 43, as the forces acting on pivots 64 and 70 are equal and opposite. Also, the piston is floating, that is, it is not connected or affixed to any part of the vehicle chassis.

In FIG. 8, I show a slightly modified arrangement of the form shown in FIGS. 1 and 2. In this form, the spring 135 rests normally on the hub 34 and washer 33. In order to damp out vibration and prevent rattle, the upper coil of spring 135 or the whole spring may have a coating of resilient plastic or other elastomeric material, as at 136 in FIG. 10. In this form, preloading takes place in the same manner as in FIGS. 1 and 2, except that the spring is not fixed on the bearing 43 to move therewith.

A slight modication of the form of FIGS. 3 and 4 is shown in FIG. 9. Here the spring 235 closely surrounds the member 30a and is normally in relaxed position, in engagement with both the bearing 43 and the hub 34 and washer 33. The links 62 and 63, 68 and 69, and the pistons rod 66 and cylinder 67 are as in FIGS. 3 and 4. The mid point of the spring 235 or the whole spring may be given a resilient coating like the coating 136 as shown in FIG. 10 to prevent excessive rattle of these parts in use.

From the foregoing it can be seen that I have provided a novel construction wherein an auxiliary spring can be mounted on a conventional telescoping type of shock absorber and that said auxiliary spring may be preloaded by a manually controlled cable from the driver's compartment or from hydraulic control source. The mounting of the auxiliary springs is exceedingly simple as it goes on to existing shock absorbers which have suitable mounts at their upper and lower ends which are relatively squeak-free and a minimum of mounting troubles are involved. An overload spring has been provided in which the retention in its inactive position is obtained by friction means and it is forced into inactive position by the depresson of the rear springs in ordinary road action thereby eliminating other retracting means which may be more complicated and expensive.

Other features of the invention will be more particularly pointed out in the accompanying claims.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a vehicle having sprung and unsprung assemblies with a telescoping-type shock absorber having its relatively movable end portions respectively connected with said sprung and unsprung assemblies: the improvement comprising a collar slidably mounted on one end portion of said shock absorber, a coil spring surrounding said shock absorber and adapted to be preloaded by movement of said collar on said shock absorber end portion, a pair of links pivotally connected together and one of which is connected to said one end portion of said shock absorber and the other one of which is connected to said collar so that relative pivotal movement of said links will move said collar into and out of loading arrangement with said spring, means for controlling the movement of said links including fluid motor means connected with said links, and remotely controlled pump means for actuating said fluid motor means.

2. In a vehicle having a body with a driver's compartment and ground wheel supporting structure with a telescoping-type shock absorber having its relatively moving end portions respectively connected to said body and said structure: the improvement comprising a collar slidably mounted on one end portion of said shock absorber, a coil spring surrounding said shock absorber and adapted to be preloaded by movement of said collar, two pairs of links, each pair being pivoted together at one end and one link of each pair being pivoted at its other end on the said end portion of said shock absorber and the other link of each pair being pivoted at its other end on said collar, control means actuatable from the driver's compartment of the vehicle body for controlling the position of said links, said control means including a piston and cylinder unit comprising a piston connected to one common pivot of said links and a cylinder connected to the other common pivot of said links whereby to provide a fluid motor for actuating said links, and pump means operatively connected with said piston and cylinder unit actuatable to operate said piston and cylinder unit and control the position of said links so as to control the loading and unloading of said spring by said collar.

References Cited in the file of this patent

UNITED STATES PATENTS

| | | |
|---|---|---|
| 572,051 | Duryea | Nov. 24, 1896 |
| 2,230,069 | Rushmore | Jan. 28, 1941 |
| 2,892,636 | Walker | June 30, 1959 |